(12) United States Patent
Maurer

(10) Patent No.: US 9,854,939 B2
(45) Date of Patent: Jan. 2, 2018

(54) DEVICE FOR GRILLING AND COOKING

(71) Applicant: WETZEL AG, Birmensdorf (CH)

(72) Inventor: Martin Maurer, Gebenstorf (CH)

(73) Assignee: WETZEL AG, Birmensdorf (CH)

( * ) Notice: Subject to any disclaimer, the term of this patent is extended or adjusted under 35 U.S.C. 154(b) by 26 days.

(21) Appl. No.: 14/892,785

(22) PCT Filed: May 20, 2014

(86) PCT No.: PCT/EP2014/060332
§ 371 (c)(1),
(2) Date: Nov. 20, 2015

(87) PCT Pub. No.: WO2014/187820
PCT Pub. Date: Nov. 27, 2014

(65) Prior Publication Data
US 2016/0128512 A1   May 12, 2016

(30) Foreign Application Priority Data

May 21, 2013 (CH) .......................................... 988/13
Nov. 1, 2013 (CH) ....................................... 1843/13

(51) Int. Cl.
A47J 27/00 (2006.01)
A47J 37/07 (2006.01)
(52) U.S. Cl.
CPC ........... *A47J 37/07* (2013.01); *A47J 37/0704* (2013.01)
(58) Field of Classification Search
CPC .... A47J 37/0623; A47J 37/07; A47J 37/0704; A47J 37/0763

USPC .......... 99/339, 385, 400–401, 415, 444–446; 219/391–392, 399
See application file for complete search history.

(56) References Cited

U.S. PATENT DOCUMENTS 3,991,666 A * 11/1976 Tidwell ............... A47J 37/0763
99/352
4,034,662 A   7/1977 McLane
(Continued)

FOREIGN PATENT DOCUMENTS

EP   0653917   5/1995
EP   2143362   1/2010
(Continued)

OTHER PUBLICATIONS

International Search Report dated Jul. 28, 2014 for PCT/EP2014/060332.
(Continued)

*Primary Examiner* — Dana Ross
*Assistant Examiner* — Joseph Iskra
(74) *Attorney, Agent, or Firm* — Fleit Gibbons Gutman Bongini & Bianco PL; Paul D. Bianco; Katharine Davis Wong

(57) ABSTRACT

A device for grilling and cooking food. The device should be easy to produce and safe to handle. The device includes a pan made of steel with lateral walls and a heating surface for cooking food, which heating surface is disposed largely horizontal, optionally with a slight incline inwards, and which is connected to the lateral walls. The pan includes a grate-like intermediate base disposed parallel to the heating surface, with the heating surface disposed at least along one of the lateral walls of the pan.

14 Claims, 3 Drawing Sheets

(56) References Cited

U.S. PATENT DOCUMENTS

| | | | | |
|---|---|---|---|---|
| 4,598,634 | A | * | 7/1986 | Van Horn, II ........ A47J 37/067 99/340 |
| 4,635,612 | A | | 1/1987 | Kakubari et al. |
| 5,649,477 | A | | 7/1997 | Lingwood |
| 2007/0277800 | A1 | | 12/2007 | Chiang |

FOREIGN PATENT DOCUMENTS

| | | |
|---|---|---|
| EP | 2345356 | 7/2011 |
| EP | 2581003 | 4/2013 |
| GB | 2164245 | 3/1986 |
| WO | 94/03093 | 2/1994 |

OTHER PUBLICATIONS

Written Opinion of the International Searching Authority dated Nov. 21, 2015 for PCT/EP2014/060332.
International Preliminary Report on Patentability dated Nov. 24, 2015 for PCT/EP2014/060332.

* cited by examiner

DEVICE FOR GRILLING AND COOKING

FIELD OF THE INVENTION

The invention relates to a device for grilling and cooking food.

BACKGROUND OF THE INVENTION

The device comprises a pan made of steel with a base, lateral walls and a heating surface for cooking food, which heating surface is disposed largely horizontal, optionally with a slight incline inwards, and which is connected to the lateral walls of the pan.

Devices and equipment for grilling and cooking food are used both to meet individual needs as well as in the industrial sector, outdoors as well as in the kitchen area.

Grill units of differing design and modes of operation for example are known, wherein the required thermal energy for cooking food is generated by different media.

Widespread use is made of grill units with a container, which in the lower region comprises means for burning gases or solids and a grill grate located above spaced apart from the latter, wherein the thermal energy generated during the burning is intended to be conveyed to the grill grate to the greatest possible extent.

Widespread use is made of charcoal and combustible gases as combustible materials. EP 0653917 B1 discloses a gas grill for use outdoors, wherein gas burners are disposed in a ring in the base region of a spherical container. A further container for catching fat and so forth dripping down is disposed beneath the gas burners. Such drops of fat are conveyed by a conical wall from the grill grate into the container for the catching thereof, so that they cannot get onto the burner ring.

Charcoal grills are in principle constructed in a similar manner, wherein a fire grate through which air can flow is provided instead of the gas burner, on which fire grate the charcoal glows. The dripping of fat or other liquids into the glowing charcoal can be avoided by collecting trays or suchlike, wherein the food to be cooked lies on the grill grate.

In another embodiment, stones, for example lava stones, can also be heated with gas burners, said stones then serving as heat storage elements for the food to be cooked.

In order to avoid the drawbacks of the aforementioned grill units, a device for cooking food made of steel or cast iron is proposed in EP 2143362 B1 and EP 2581003 A1, said device being intended to enable direct cooking at an optimum cooking temperature over a lengthy period and using combustible materials on a wood base. For this purpose, the device comprises a heating pan in the form of a cut spherical or ellipsoidal shell with a heating surface. The heating surface is designed such that food can be cooked directly thereon and is a circular ring surface running essentially perpendicular to the axis of rotation of the heating pan. The outer edge of the heating surface is fixedly connected to the cut edge of the heating pan. An intermediate base is provided in the heating pan and an opening for removing ash is provided in the lowest region of the heating pan, wherein such an opening should also be provided lying coaxially in the intermediate base.

The heating pan is mounted in a mobile manner on a ring which lies on the supporting surface. The opening for removing ash in the heating pan ends at the supporting surface.

SUMMARY OF THE INVENTION

One aspect of the invention relates to a device for cooking food or suchlike whilst avoiding the drawbacks of the prior art. In particular, it should be easy to produce and safe to handle.

In one embodiment, the device according to the invention for grilling and cooking food comprises a pan, which comprises at least one intermediate base, lateral walls and a heating surface, wherein the heating surface is disposed essentially perpendicular to and at least along one of the lateral walls of the pan. The device according to the invention, or the pan, preferably has a cubic basic shape.

Other embodiments are also disclosed.

The pan can have a cubic, rectangular, triangular or polygonal or also a semicircular cross-section. The lateral walls comprise side walls, a front side and a rear wall in a differing embodiment.

The intermediate base is disposed at least in the central region, i.e. beneath the open region of the heating surface, and is constituted slotted and/or grate-like in the region of a tray.

The device preferably stands on feet, which are disposed on the intermediate base or on the lateral walls, wherein the feet also preferably enable a spacing between the lower edges of the lateral walls and the base. They are at least of the same length.

Instead of the feet, the lateral walls could also be extended downwards and also be constituted bent off inwards.

Furthermore, a lower, continuous and closed base can also be provided parallel to the intermediate base, said lower base also being welded to the lateral walls.

The pan can also be provided with a separate, inner and optionally reinforced frame, to which the parts of the pan can be fixed, in particular by means of a weld joint, or the walls could additionally be welded to the frame.

The heating surface can extend overlapping frame-like along the lateral walls of the pan or at least over parts thereof, but at least run around a side wall thereof. And it is orientated essentially horizontally.

An insertable and retractable tray is advantageously provided beneath the intermediate base, said tray being able to be disposed beneath the slotted and/or grate-like region of the intermediate base. The tray is retractable at one of the lateral walls.

The heating surface can be inclined inwards, preferably at an angle of up to approx. 5°. Along the side walls, it overlaps partial regions of the pan open at the top, wherein it can extend completely or only partially along the side walls.

The heating surface is made of special steel, whereas the other parts of the pan are preferably made of COR-TEN® steel, a weather-resistant, structural steel.

The walls can also be constituted doubled, with fireclay bricks as heat storage elements in between and for preventing an excessively high temperature on the external walls. The grill can also be constituted mobile, for example with an undercarriage or suchlike.

The device according to the invention is corrosion-resistant, guarantees a high degree of convenience during grilling over a wood or coal fire and a secure upright position. Any occurring ash can be removed and disposed of without adversely affecting the environment.

BRIEF DESCRIPTION OF THE DRAWINGS

The invention is described in greater detail below in an example of embodiment with the aid of a drawing. In the drawing.

DETAILED DESCRIPTION OF THE INVENTION

Figure 1:
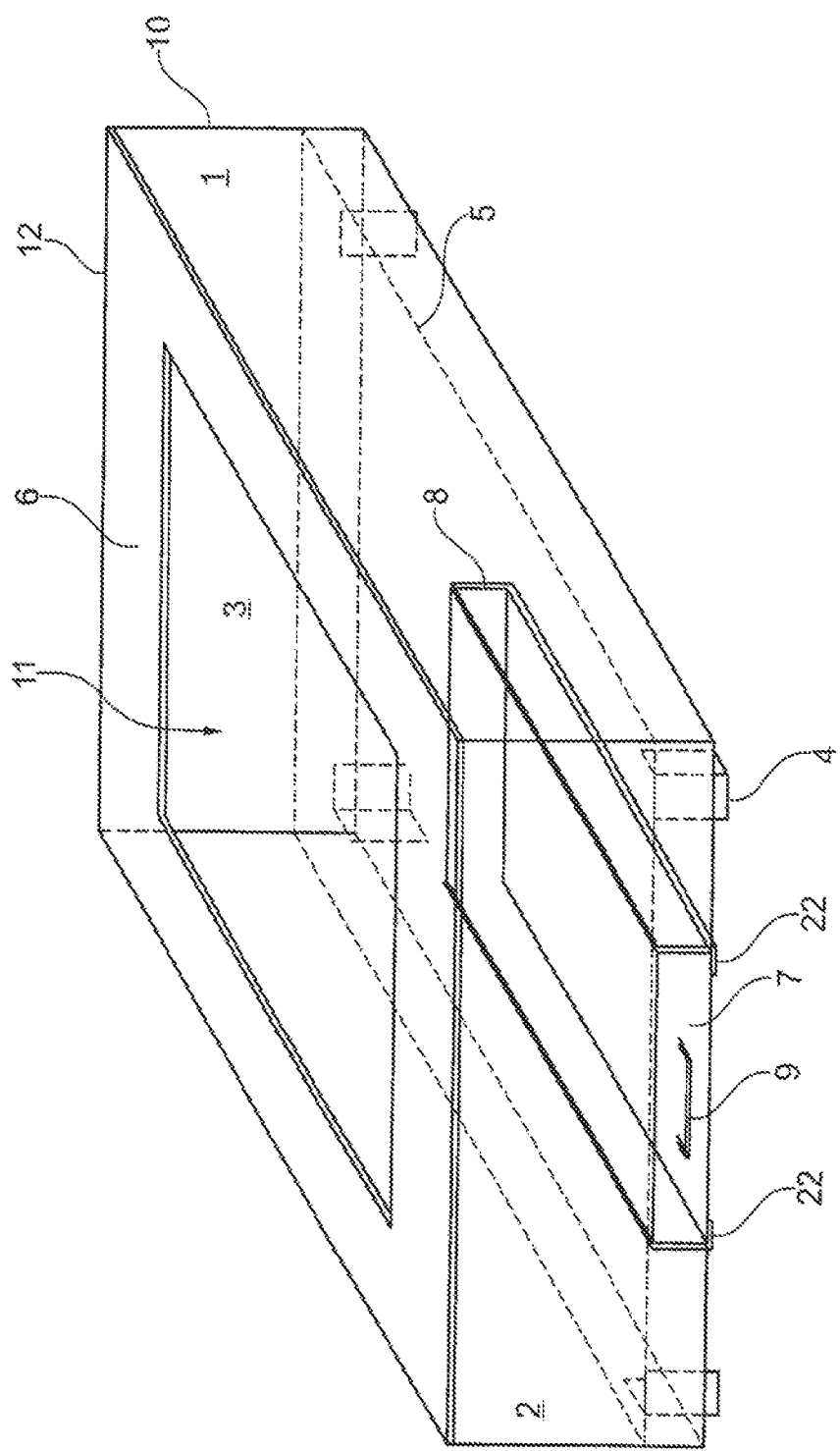
FIG. 1 shows the device according to the invention for grilling and cooking food in a perspective representation in cross-section.

In the embodiment according to FIG. 1, a device according to the invention comprises a fire-resistant cubic pan 12 made of COR-TEN® steel, whereof longitudinal walls 1, front side 2, rear wall 3 and heating surface are welded together at the respective edges. An intermediate base 5 is incorporated, by welding, perpendicular thereto and parallel to and spaced apart from the supporting surface and heating surface 6. In each corner of the pan, a foot 4 made of steel is welded or screwed to the underside of intermediate base 5, said foot being somewhat longer than the distance from intermediate base 5 to the lower edge of longitudinal walls 1, front side 2 and rear wall 3. The base area is open apart from a tray 8 for catching the ash.

In the example, walls 1, 2 and 3 have a length of 1200 mm and a height of 420 mm.

The remaining walls, intermediate base 5 and a tray 8 are also made of COR-TEN® steel, a thickness of 6 mm.

An insertable and retractable tray 8 is provided beneath intermediate base 5, said tray are being able to be disposed beneath a slotted and/or grate-like region of the intermediate base. Tray 8 is mounted in a sliding manner on two guide plates 22 disposed in parallel on intermediate base 5 and is provided at the front side with a handle 9, so that it can easily be pulled out and inserted through a tray opening 7, for example at front side 2. It could also be disposed so as to be retractable laterally or to the rear.

Guide plates 22 are for example U- or L-shaped and preferably welded to intermediate base 5.

Heating surface 6 is made of special steel and is also welded at the edges to side walls 1, front side 2 and rear wall 3.

Lateral edges 10 are provided with thick, continuous weld seams.

All the external weld seams are ground. Heating surface 6 made of special steel is for example 10 mm thick and frame-like, running completely around the side walls of pan 12 with a wide support surface of 150-300 mm for the product to be cooked. Remaining rectangular opening ensures optimum burning and glowing of the combustible material present on intermediate base 5. Wood or charcoal is preferably used as a combustible material. It burns on intermediate base 5 over tray 8 for the ash. The intermediate base is slotted or grate-like in the region of the wood support area, on the one hand to allow the ash to fall through into tray 8 and on the other hand for ventilation of the glowing fire.

Side walls 1 as well as rear wall 3 are either closed or can preferably be decorated with perforations or ornaments above intermediate base 5, optionally also front side 2, 18.

The width of the support area of heating surface 6 on the other hand enables protection against the glowing fire and yet a high heat input from below by the glowing fire as well as reflecting from the side walls. The temperature diminishes from the middle to the outer edge, which offers a large variety of possible uses for cooking different foods and for merely heating food up or keeping cooked food hot.

Heating surface 6 is preferably inclined slightly inwards, for example at an angle of up to approx. 5° relative to side edges 10. All the liquids emerging from the food thus also run away. They can either evaporate or burn in the glowing fire or a connecting channel with a collection container can be provided at the inner edge of heating surface 6.

When not in use for a lengthy period, the device can be tipped over onto a side wall 1.

Figure 2:
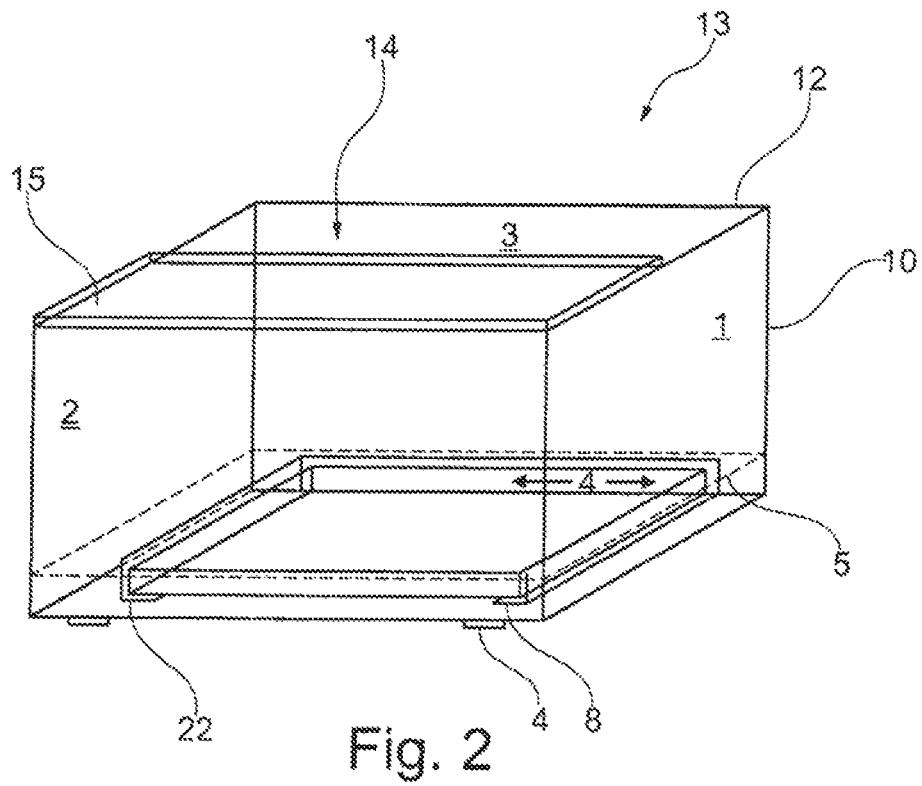
FIG. 2 shows the device according to the invention in a further embodiment.
Figure 3:
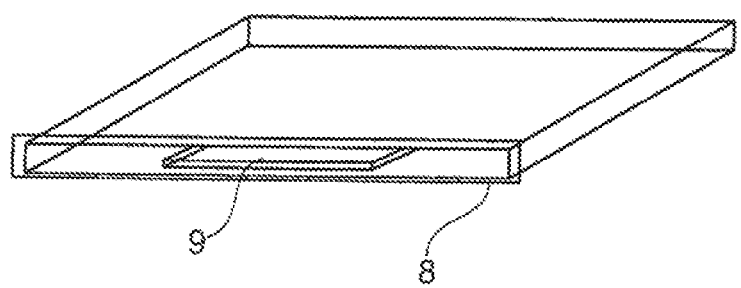
FIG. 3 shows a tray of the device according to the invention.

In an embodiment according to FIG. 2, the device according to the invention comprises for example a heating surface 15 partially overlapping opening 14. The remaining part of the opening 14 is constituted open and without heating surface 15 between a back 13 or rear wall 3 of pan 12 and heating surface 14. Heating surface 15 is constituted wider than in the first embodiment (FIG. 1). Tray 8 can be retracted to the rear through tray opening 7 at back 13 in the region of opening 14.

In such an embodiment of the device, the cross-section of pan 12 is preferably smaller than in the first embodiment. The cross-section can also be triangular, polygonal or semi-circular or suchlike, wherein heating surface 14 is then also formed or can be formed triangular, polygonal or semicircular.

The individual parts of the device are again made of COR-TEN® steel with a plate thickness of 3-8 mm. Heating surface 14 is made of special steel similar to the first embodiment, with smaller dimensions of the device compared to the first embodiment with a plate thickness of 4-10 mm.

Figure 4:
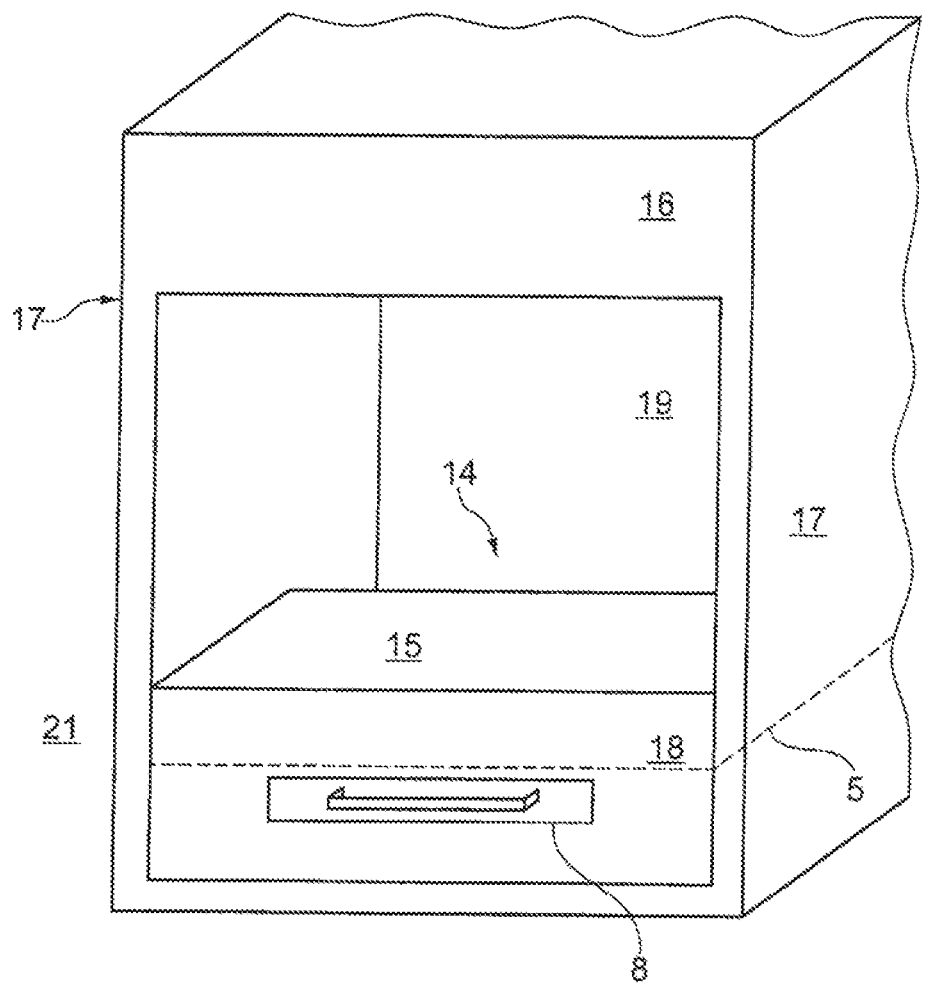
FIG. 4 shows the device according to the invention in a third embodiment.

In a third embodiment of the device according to the invention (FIG. 4), the latter is disposed in a wood pile 22, a wood wall or suchlike. All the walls, which make contact with the wood or suchlike, i.e. at least longitudinal walls 17, rear wall 19 and base 20, are constituted double-walled and filled with a heat-insulating material, for example fireclay or ceramic bricks.

In the third embodiment of the device according to the invention, the latter, in contrast with the second embodiment according to FIG. 2, actually stands on the front side, which now forms a base 20. Heating surface 15 projects approximately parallel to base 20 into the interior or opening 14. Tray 8 is in turn disposed retractable forwards between intermediate base 5 and base 20.

Instead of a fourth lateral wall, a chimney 16 is placed on longitudinal walls 17 and rear wall 19 for the purpose of smoke extraction and safety against flying sparks.

The wood-contacting walls of chimney 16 and the rear wall are also constituted double-walled and filled with a heat-insulating material, for example fireclay or ceramic bricks.

LIST OF REFERENCE NUMBERS

1 longitudinal wall
2 front side
3 rear wall
4 foot
5 intermediate base
6 heating surface
7 tray opening
8 tray
9 handle
10 lateral edge
11 opening
12 pan 13 back
14 opening
15 heating surface
16 chimney
17 longitudinal wall
18 front side
19 rear wall
20 base
21 wood pile
22 guide plate

The invention claimed is:

1. A grill comprising:
upwardly-extending lateral walls defining an interior periphery of the grill, an exterior periphery of the grill, and an interior volume of the grill bounded by the lateral walls, the lateral walls not extending completely around a periphery of the grill to thereby define an open front area communicating between an exterior of the grill and the interior volume of the grill;
a top surface connected to the lateral walls to thereby define and enclose an upper surface of the interior volume of the grill;
an intermediate base connected to one or more of the upwardly-extending lateral walls and forming a surface having openings sized to support unburned combustible material and to admit passage of burned combustible material therethrough;
a heating pan surface;
positioned within the interior volume of the grill along the lateral walls at a position between the top surface and the intermediate base,
the heating pan surface connected to the lateral walls to extend along at least two of the lateral walls along a portion of the interior periphery,
the heating pan surface not continuously extending between all the lateral walls to thereby form a heat-passing opening,
the heat-passing opening communicating between the intermediate base and an area between the top surface and the heating pan surface,
the heating pan surface downwardly inclined in a direction of the heat-passing opening; and
a receiving tray disposed beneath the intermediate base and positioned to catch the burned combustible material, the receiving tray slidably insertable and retractable through a tray opening in one of the lateral walls.

2. The grill according to claim 1, further comprising a closed base disposed beneath the intermediate base.

3. The grill according to claim 1, further comprising feet which support the grill above a surface when the grill is placed upon the surface.

4. The grill according to claim 1, further comprising an inner frame on which parts of the grill are disposed and fixed.

5. The grill according to claim 1, wherein the heating pan surface downwardly inclines at an angle of at least 5°.

6. The grill according to claim 1, wherein the lateral walls of the grill are composed of weather-resistant structural steel.

7. The grill according to claim 1, wherein a shape of a cross-section of the grill is selected from the group consisting of cubic, triangular, polygonal, and semicircular shapes.

8. The grill according to claim 1, wherein at least one of the lateral walls is lined with a heat-insulating material.

9. The grill according to claim 1, further comprising a chimney to communicate heat from the intermediate base to the exterior of the grill.

10. The grill according to claim 1, wherein at least one of the lateral walls includes perforations.

11. The grill according to claim 1, wherein the heating pan surface is welded to the lateral walls.

12. The grill according to claim 1, the lateral walls fabricated from a first type of metal and the heating pan surface fabricated from a second type of metal different than the first type of metal.

13. The grill according to claim 1, the heat-passing opening positioned relative to the intermediate base to enable direct passage of heat from burning combustible material therethrough, the heating pan surface adjacent the heat-passing opening to be thereby heated by indirect heat from burning combustible material.

14. The grill according to claim 1, wherein the receiving tray is slidably disposed on guide plates mounted in parallel to the intermediate base.

* * * * *